United States Patent
Gay et al.

(10) Patent No.: US 10,006,752 B2
(45) Date of Patent: Jun. 26, 2018

(54) METHOD FOR MEASURING THE THICKNESS OF A COATING LAYER BY INDUCING MAGNETIC FIELDS

(71) Applicants: MESSIER-BUGATTI-DOWTY, Velizy-Villacoublay (FR); AIRCELLE, Gonfreville-l'Orcher (FR)

(72) Inventors: Lionel Gay, Le Havre (FR); Nicolas Garrigou, Velizy-Villacoublay (FR); Francis Monerie-Moulin, Velizy-Villacoublay (FR)

(73) Assignees: MESSIER-BUGATTI-DOWTY, Velizy Villacoublay (FR); AIRCELLE, Gonfreville l'Orcher (FR)

( * ) Notice: Subject to any disclaimer, the term of this patent is extended or adjusted under 35 U.S.C. 154(b) by 840 days.

(21) Appl. No.: 14/350,398

(22) PCT Filed: Oct. 17, 2012

(86) PCT No.: PCT/EP2012/070599
§ 371 (c)(1),
(2) Date: Apr. 8, 2014

(87) PCT Pub. No.: WO2013/057157
PCT Pub. Date: Apr. 25, 2013

(65) Prior Publication Data
US 2014/0324384 A1    Oct. 30, 2014

(30) Foreign Application Priority Data
Oct. 20, 2011    (FR) ...................................... 11 59513

(51) Int. Cl.
*G01B 7/06*    (2006.01)

(52) U.S. Cl.
CPC ................ *G01B 7/105* (2013.01); *G01B 7/06* (2013.01)

(58) Field of Classification Search
CPC .................................. G01B 7/105; G01B 7/06
See application file for complete search history.

(56) References Cited

U.S. PATENT DOCUMENTS

| 5,889,401 A | * | 3/1999 | Jourdain | ................ | G21C 17/06 |
| | | | | | 324/207.16 |
| 6,377,039 B1 | * | 4/2002 | Goldfine | ................ | G01B 7/105 |
| | | | | | 324/207.17 |

(Continued)

*Primary Examiner* — Janet Suglo
*Assistant Examiner* — Eyob Hagos
(74) *Attorney, Agent, or Firm* — Sughrue Mion, PLLC (57) ABSTRACT

A method of measuring the thickness of a coating layer of a workpiece, the layer being formed on a substrate of the workpiece. The method comprises several steps. First, feeding a probe alternating electrical signal to induction device in order to induce a magnetic field in the workpiece. Second, measuring at least one physical characteristic that varies as a function of the magnetic field induced in the workpiece. Third, determining first and second values of an indicator, the values being determined respectively from measurements of the physical characteristic taken when the electrical signal has first and second given frequencies. Forth, calculating the difference between the first and second values of the indicator and determining the thickness of the coating layer as a function of the difference and of predetermined data correlating: the difference between the values of the indicator; and corresponding values for thicknesses of the coating layer.

8 Claims, 3 Drawing Sheets

(56) References Cited

U.S. PATENT DOCUMENTS

| | | | |
|---|---|---|---|
| 7,019,519 B2 * | 3/2006 | Le ........................ | G01B 7/105 324/225 |
| 7,112,960 B2 * | 9/2006 | Miller .................. | B24B 37/013 324/228 |
| 7,262,867 B2 * | 8/2007 | Lasagni ................ | G01B 11/06 324/230 |
| 2007/0096726 A1 * | 5/2007 | Hachtel ................ | G01B 7/105 324/229 |
| 2009/0251137 A1 * | 10/2009 | Daalmans .............. | G01B 7/105 324/230 |

* cited by examiner

METHOD FOR MEASURING THE THICKNESS OF A COATING LAYER BY INDUCING MAGNETIC FIELDS

CROSS REFERENCE TO RELATED APPLICATIONS

This application is a National Stage of International Application No. PCT/EP2012/070599 filed Oct. 17, 2012, claiming priority based on French Patent Application No. 11 59513 filed Oct. 20, 2011, the contents of all of which are incorporated herein by reference in their entirety.

BACKGROUND OF THE INVENTION

Several methods are known for measuring the thicknesses of coatings supported by substrates. Some of these methods make use of:
  measuring the shape of workpieces, before and after applying the coating to the substrate; or
  measuring the magnetic permeability of the substrate by means of a probe placed on the coating and consequently spaced apart from the substrate by a distance corresponding to the thickness of the coating (acting as a magnetic circuit gap and sometimes referred to as "lift-off"); or
  using eddy currents generated in the substrate to perform the measurements, providing the coating is non-conductive while the substrate is itself conductive.

Nevertheless, those methods have drawbacks. The first above-mentioned method cannot measure accurately the thickness of the coating carried by a cylindrical surface, e.g. when the substrate is in the form of a body of revolution such as a tube for airplane landing gear. Measuring the diameter of the coated cylinder gives an idea about the sum of the thicknesses of the coatings on the opposite sides of the cylinder, but it does not make it possible to know the individual values of each of those thicknesses. With such a method, it is not possible to guarantee that the coating formed on the cylindrical substrate does indeed have a minimum thickness as required by standards.

When coating a material that is electrically conductive, such as tungsten carbide (WC—Co—Cr) placed on a substrate that is conductive and non-magnetic, such as titanium, neither of the last two methods gives satisfaction.

The second method cannot be used when the substrate is non-magnetic, since the magnetic field used in measuring magnetic permeability is not disturbed by titanium. It is therefore not possible to detect any variation in the magnetic field as a function of the distance of the probe from the substrate, so is it not possible to deduce therefrom the thickness of the coating layer.

The use of eddy currents for detecting the thickness of an electrically conductive coating carried on a substrate that is also conductive lacks accuracy and it is desirable to improve such accuracy.

OBJECT OF THE INVENTION

An object of the invention is to provide a method and/or a device making it possible, by performing measurements in non-destructive manner, to estimate the thickness of a coating supported by a substrate, it being understood that the coating and the substrate are both electrically conductive and that the substrate is preferably non-magnetic.

The non-magnetic material forming the substrate is typically an alloy of titanium such as:

an alloy known under the trade name Ti5553 which contains Ti, less than 5% Al, 5% Mo, 5% V, 3% Cr, and 0.5% Fe; or
an alloy known under the trade name Ti10-2-3 containing Ti in the range 82.855% to 86.8%, V in the range 9.00% to 11.0%, preferably 10%, Fe in the range 1.60% to 2.20%, preferably 2%, Al in the range 2.60% to 3.40%, preferably 3%, C less than or equal to 0.0500%, H less than or equal to 0.0150%, N less than or equal to 0.0500%, other elements less than or equal to 0.300%, 0 less than or equal to 0.130% (these percentages being percentages by weight of the elements in the alloy).

The material forming the coating of thickness that is to be measured is an electrically conductive alloy, typically a carbide such as tungsten carbide (WC), cobalt, and chromium.

SUMMARY OF THE INVENTION

The invention relates essentially to a method of measuring the thickness of a coating layer of a workpiece formed on a substrate of the workpiece. The coating and the substrate are constituted respectively by first and second mutually distinct electrically conductive materials. The method further comprises the steps of:
  positioning induction means relative to the coating layer and feeding a probe alternating electrical signal to the induction means in order to induce a magnetic field in the workpiece that depends on the probe electrical signal;
  measuring at least one physical characteristic that varies as a function of the magnetic field induced in the workpiece;
  determining first and second values of an indicator, this indicator depending at least on the electrical conductivity of the first material and on the frequency of the probe electrical signal. By way of example, this indicator is the conductivity of a portion of the workpiece through which the induced magnetic field passes.

The first indicator value is determined from a measurement of said at least one physical characteristic taken when the electrical signal has a first given frequency, and the second indicator value is determined from a measurement of said at least one physical characteristic taken when the electrical signal has a second given frequency distinct from the first frequency.

Thereafter, the method of the invention comprises the following steps:
  calculating the difference between the first and second values of the indicator and determining the thickness $e_r$ of the coating layer as a function of this difference and of predetermined data correlating:
    the difference between the indicator values; and
    corresponding values for thicknesses of the coating layer.

By taking a plurality of measurements on different workpieces having exactly the same pair of first and second materials, but with layer thicknesses that are different from one to another, and by using the same induction means and the same probe electrical signal, it is found that the variation in the thickness of the coating layer is a parameter that has an influence on the measured physical characteristic, which specifically is an impedance Z that varies as a function of the magnetic field induced in the workpiece. Thus, there is indeed a connection between the thickness of the layer and the characteristic of the magnetic field passing through said layer. Nevertheless, by performing numerous tests, it has been found that the correlation between the variation in the thickness of the coating layer and the variation in the measured physical characteristic of the magnetic field is not easy to define.

In summary, in the method of the invention, first and second measurements are made of the physical characteristic that varies as a function of the magnetic field induced in the workpiece. The first measurement of the physical characteristic is then taken while the induction means are being fed with a probe signal having a first frequency and the second physical characteristic measurement is taken while the induction means are being fed with a probe signal having a second frequency different from the first frequency.

Using the result of the first measurement, a first value taken by an indicator is determined.

Using the result of the second measurement, a second value taken by the indicator is determined.

Specifically, the indicator evaluated from the measured physical characteristic is preferably the electrical conductivity of the portion of the workpiece through which the magnetic field passes. Thus, in the examples below, the first indicator value is the conductivity of the portion of the workpiece through which there passes the magnetic field that is generated while the probe signal has a first frequency $F_1$, and the second indicator value is the conductivity of the portion of the workpiece through which there passes the magnetic field that is generated while the probe signal has a second frequency $F_2$.

An essential aspect of the invention consists in using the difference between these first and second values of the indicator in order to determine the thickness of the coating layer. It has been found that the thickness of the coating layer as determined by using the difference between the first and second values of the indicator as measured with distinct probe frequencies is more accurate than the thickness that would be determined if use was made of values obtained from two measurements of the characteristic of the magnetic field taken with probe signals having a same frequency.

Furthermore, the use of this difference makes it possible to evaluate the thickness of the coating layer relatively accurately, while greatly simplifying calculation, as explained below.

An advantage of this method of evaluating the thickness of a coating layer is that it requires little calculation, specifically possibly no more than a simple subtraction. Thus, the thickness evaluation device for performing the method of the invention may include calculation means that are simple and inexpensive.

BRIEF DESCRIPTION OF THE DRAWINGS

Other characteristics and advantages of the invention appear clearly from the following description given by way of non-limiting indication and made with reference to the accompanying drawings, in which.

DETAILED DESCRIPTION OF THE INVENTION

Figure 1:
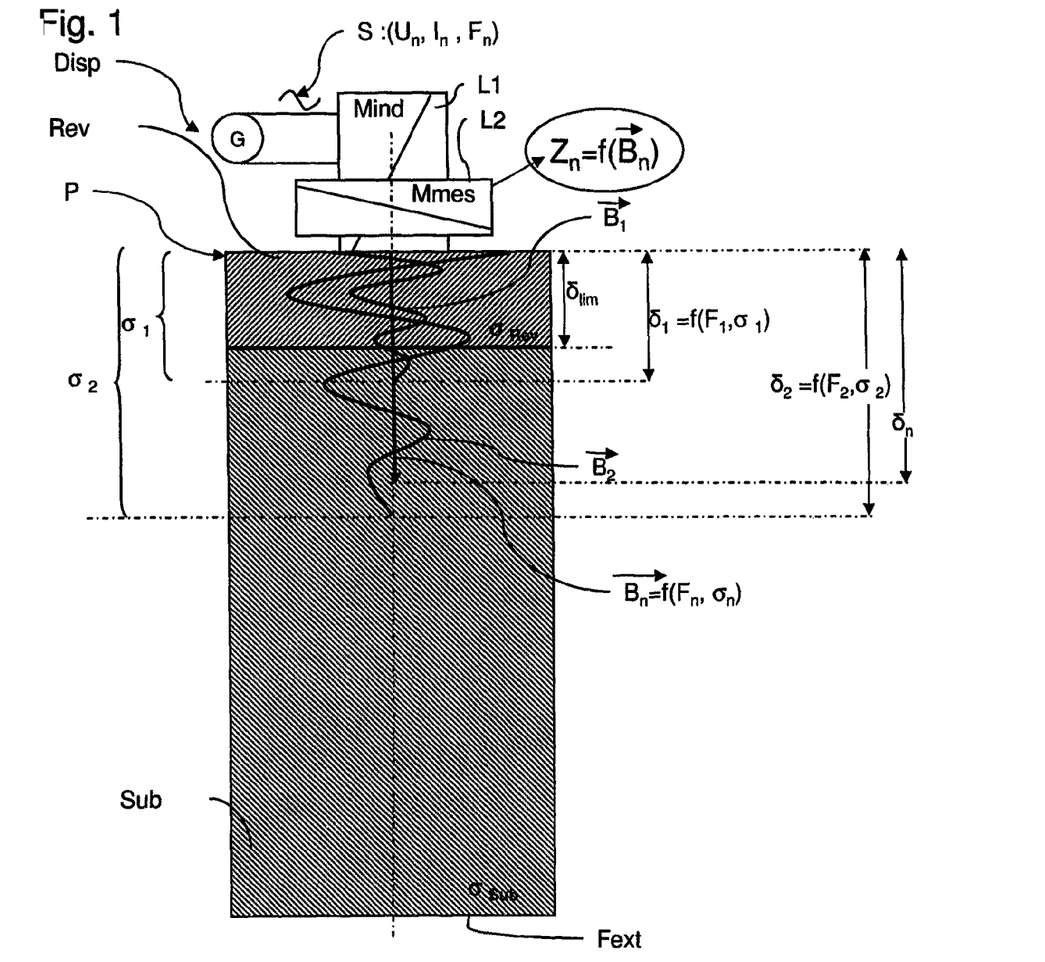
FIG. 1 shows a device enabling the method of the invention to be performed.
Figure 3:
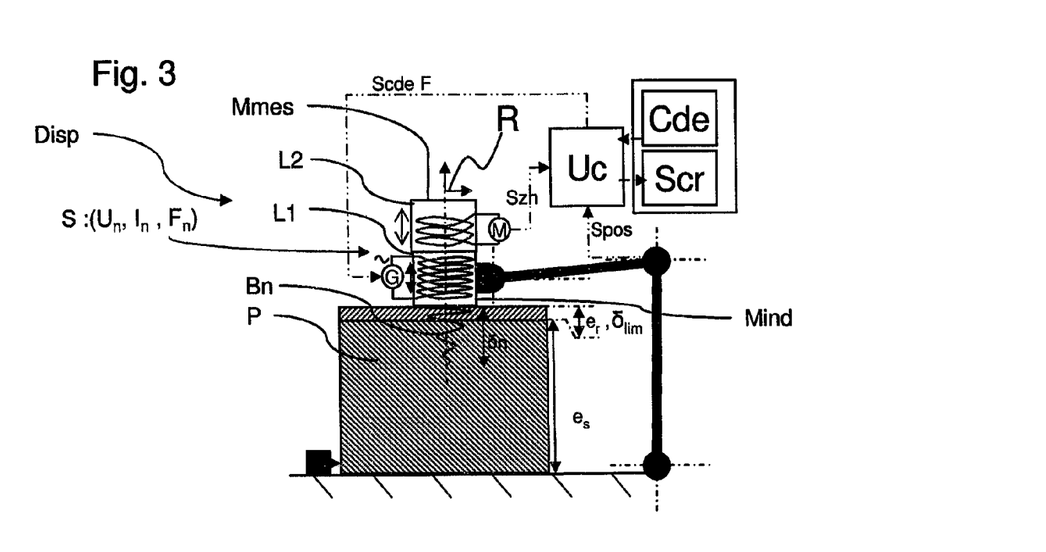
FIG. 3 is a diagrammatic view of a device of the invention enabling the measurement method of the invention to be performed in order to make a map of a workpiece so as to specify the thickness of the layer at different locations on the workpiece.
Figure 4:
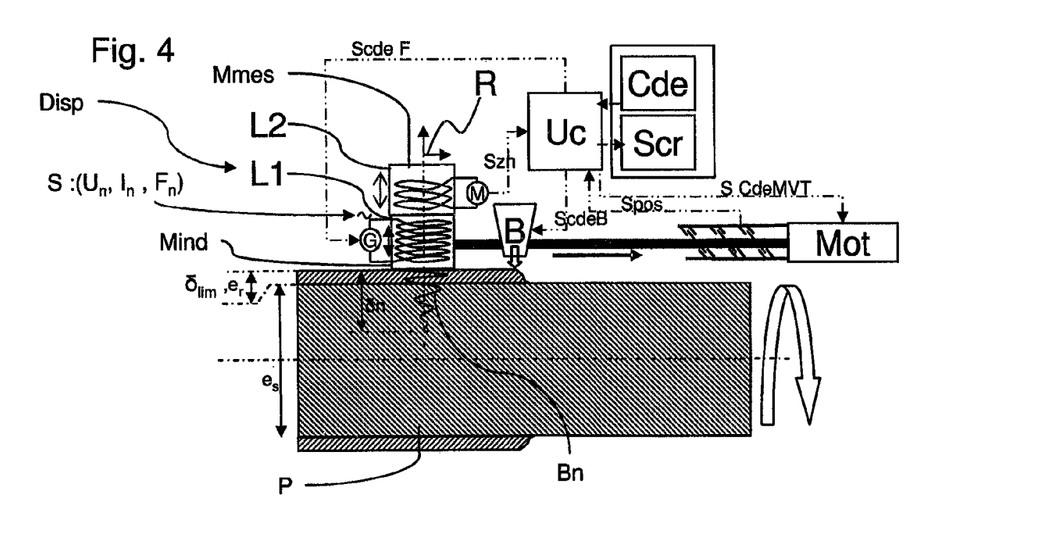
FIG. 4 is a diagrammatic view of another device of the invention also enabling the measurement method of the invention to be performed, for the purpose of measuring a layer while it is being fabricated, and thus making it possible to regulate the means for applying the layer material.

FIGS. 1, 3, and 4 are section views of respective workpieces P, each comprising a coating layer Rev of a first material carried by a substrate Sub of a second material. These first and second materials are both electrically conductive, and at least the material of the substrate is non-magnetic. Specifically, the substrate is made of titanium and the coating material is made of WC.

Figure 2:
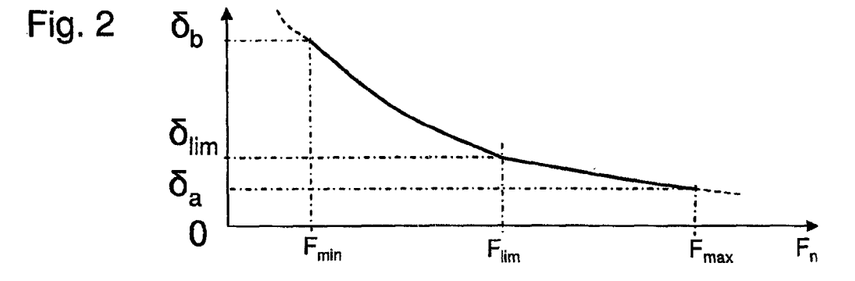
FIG. 2 is a graph showing how the penetration depth of a magnetic field in a workpiece made up of a conductive substrate and a conductive coating layer varies as a function of the frequency $F_n$ of the signal inducing the field.

In FIGS. 1 and 2, the coating layer Rev is made on only one face of the substrate Sub, whereas in FIG. 4 the substrate is a cylindrical element and the layer is annular being made all around the substrate Sub.

In order to perform the method of measuring the thickness $\delta_{lim}$ or $e_r$ of the coating layer Rev, use is made of induction means $M_{ind}$ that are connected specifically to a generator G for generating a probe alternating electrical signal S. At each instant n, this signal S has given voltage $U_n$, current $I_n$, and frequency $F_n$. In each of FIGS. 1, 3, and 4, the induction means $M_{ind}$ are made using a coil L1. Use is also made of means for measuring a physical parameter that varies as a function of the field B induced by the induction means $M_{ind}$ in the workpiece P. These measurement means $M_{mes}$ include measurement electronics M, and in FIGS. 1, 3, and 4, they comprise a coil L2 having inductance $Z_n$ that varies as a function of the magnetic field $B_n$ that is induced in the workpiece P at each instant n.

It should be observed that these measurement means $M_{mes}$ may also be made using measurement electronics M connected directly to the coil L1 in order to measure variation in the impedance of the coil L1 as a function of the signal S delivered by the generator G and as a function of the magnetic field $B_n$ induced in the workpiece P. Under such circumstances, there is no need for the coil L2, since the coil L1 suffices.

The measurement means $M_{mes}$ deliver a signal Szn to a calculation unit Uc, which signal is representative of the physical characteristic measured by the measurement means $M_{mes}$ constituted in this example by the impedance $Z_n$ of the coil L2. As can be seen in FIGS. 3 and 4, the calculation unit Uc is connected to a man/machine interface comprising:
  control means Cde serving for example to enable the user to program or set parameters for the measurement device Disp, e.g. in order to perform the operations necessary for determining the frequencies $F_1$ and $F_2$; and
  information display means such as a screen Scr, e.g. serving to display the result of measuring the thickness $e_r$, which is also written $\delta_{lim}$.

The devices Disp of FIGS. 3 and 4 also have detector means for detecting the position R of the induction means $M_{ind}$ relative to the workpiece P, which means deliver a signal Spos to the calculation unit Uc, which signal is representative of the position R.

The calculation unit Uc stores the position R of the induction means $M_{ind}$ relative to the workpiece P, and it associates at least some of the stored positions R with the corresponding measured thickness values $e_r$, $\delta_{lim}$. The device of the invention Disp can thus be used to generate files that show variations in the thickness $e_r$ of the layer Rev, by specifying for a series of positions R the corresponding measured thicknesses of the layer.

The calculation unit Uc is also connected to induction means, in particular to the generator G for generating the signal S in order to transmit a control signal ScdeF for controlling the signal, e.g. by determining the frequency $F_n$ of the signal S that the generator is to deliver to the coil L1.

The device Disp may also have a nozzle for projecting the coating Rev onto the coating substrate Sub, this nozzle B being connected to means Mot for controlling movement of the nozzle B relative to the workpiece P. In the embodiment of FIG. 4, the workpiece P is rotatably mounted on a lathe carrying the nozzle B and causing it to move relative to the workpiece P by means of a motor Mot controlled by the calculation unit Uc via a movement control signal ScdeMVT. The calculation unit is also connected to spray means feeding the nozzle B in order to control the conditions under which material is sprayed by the nozzle B. This connection enables the unit Uc to transmit a control signal ScdeB for controlling spraying conditions.

The movement control means Mot may also include means for measuring the position of the nozzle relative to the workpiece.

In the embodiment of FIG. 4, the induction means $M_{ind}$ are attached to the nozzle B in order to track it during its movements, thereby measuring the thickness $e_r$ of the coating shortly after it has been deposited.

Ideally, while measuring thickness using a method of the invention, it is ensured that the relative movement between the workpiece P and the induction means $M_{ind}$ is limited in order to obtain an accurate indication of the thickness and of the position R of the measurement.

Thus, in an implementation of the method of the invention, the positioning means Mot prevent the induction means $M_{ind}$ from moving relative to the workpiece P, at least for the time taken to measure conductivity. In this implementation, if it is desired to measure thickness during machining, arrangements can be made to move the tool B independently of the induction means and to prevent the induction means $M_{ind}$ from moving relative to the workpiece, at least during the time required for measurement, but without that stopping movement of the tool relative to the workpiece. Specifically, if the tool is a spray nozzle B, then spraying is performed continuously and while taking measurements, and the induction means are held stationary for an instant relative to the workpiece.

Alternatively, it can be accepted that the measurement is taken while the induction means $M_{ind}$ are moving relative to the workpiece P, which is acceptable for the method of the invention since the calculations it requires are simple and relatively few, thereby reducing the time required to take thickness measurements. This implementation is used for example when it is desired to perform measurements during machining while the workpiece P is moving relative to the induction means $M_{ind}$.

In the embodiment of FIG. 4, the calculation unit Uc can implement a feedback loop consisting in using the signal ScdeB to control the conditions under which the coating is sprayed as a function:
of the thickness measured by the method of the invention; and of predetermined thickness setpoints for the coating layer, each of the setpoints possibly being variable depending on the location in question on the workpiece P.

While the layer is being made, the device of the invention makes it possible to ensure that the layer complies with the setpoint.

There follows a description of how the thickness measurement method of the invention is performed.

Implementation of the Method of the Invention

With reference to FIG. 2, which plots variation in the penetration depth of the magnetic field B into the workpiece as a function of the frequency $F_n$ of the probe signal S fed to the induction means $M_{ind}$, it can be seen for the probe signal S lying in a given range of frequencies extending from a minimum frequency $F_{min}$ (e.g. 10 kilohertz (kHz)) to a maximum frequency $F_{max}$ (e.g. 960 kHz), that the higher the frequency $F_n$, the smaller the penetration depth of the field B into the workpiece P, and vice versa. This phenomenon is associated with a skin effect of the workpiece P. Thus, in this same given frequency range $F_{min}$-$F_{max}$ where $F_{min}$ is less than $F_{max}$, the higher the frequency $F_n$, the greater the influence of the conductivity $Y_{Rev}$ of the material forming the layer Rev on the measured characteristic $Z_n$ of the magnetic field B, and the smaller the influence of the conductivity $\sigma_{Sub}$ of the material forming the substrate Sub on the measured characteristic of the field B.

In this given frequency range, there is a frequency $F_{lim}$ that is the theoretical frequency from which the field B passes through the entire thickness of the layer Rev and stops at the interface between the layer Rev and the substrate Sub. Over a first frequency range $F_{lim}$-$F_{max}$ the penetration depth of the magnetic field into the workpiece is such that the magnetic field B passes into the first material of the coating layer Rev but does not penetrate into the second material of the substrate Sub. Thus, over this first range $F_{lim}$-$F_{max}$, the measured physical characteristic that varies as a function of the magnetic field B does not depend on the conductivity $\sigma_{Sub}$ of the material of the substrate, but depends solely on the conductivity $\sigma_{Rev}$ of the material of the layer. In contrast, over a second frequency range $F_{min}$-$F_{lim}$, the penetration depth $\delta_n$ of the magnetic field $B_n$ into the workpiece P is such that the magnetic field passes through the first material of the coating layer Rev and penetrates into the second material of the substrate Sub. Thus, over this range $F_{min}$-$F_{lim}$, the measured physical characteristic $Z_n$ that varies as a function of the magnetic field depends not only on the conductivity $\sigma_{Rev}$ of the coating material, but also on the conductivity $\sigma_{Sub}$ of the substrate material.

In other words, in the range $F_{min}$-$F_{lim}$, the lower the frequency of the probe signal S, the greater the influence of the conductivity $\sigma_{Sub}$ on the measured characteristic $Z_n$ and the smaller the influence of the conductivity $\sigma_{Rev}$ on the measured characteristic $Z_n$. In order to measure the thickness of the coating $\delta_{lim}$ using the method of the invention, it is desired to characterize the penetration of the magnetic field B into the workpiece P, and in order to do that a physical characteristic is measured that varies as a function of the magnetic field.

By way of example, this measured physical characteristic that varies as a function of the magnetic field may be:
an impedance $Z_n$ of the induction means $M_{ind}$; and/or
an impedance $Z_n$ of a measurement circuit $M_{mes}$ that varies as a function of the magnetic field $B_n$ induced in the workpiece P; and/or
the intensity of the magnetic field $B_n$; and/or
the penetration depth $\delta_n$ of the field $B_n$ into the workpiece; and/or the conductivity $\sigma_n$ of a portion of the workpiece P through which the magnetic field B passes; and/or the resistivity of a portion of the workpiece through which the magnetic field $B_n$ passes.

It should be observed that the conductivity $\sigma_n$ or the resistivity of the portion of the workpiece through which the magnetic field passes depends on the penetration depth of the field into the workpiece, which in turn depends on the frequency $F_n$ of the probe signal S. Conductivity $\sigma_n$ or resistivity is generally measured by measuring impedance $Z_n$.

After measuring the physical characteristic $Z_n$, the value of an indicator that depends at least on the electrical conductivity $\sigma_{Rev}$ of the first material is deduced therefrom, where this indicator may for example be the conductivity $\sigma_n$ of the portion of the workpiece through which the magnetic field passes, it being understood that this conductivity varies:

firstly as a function of the conductivity $\sigma_{Rev}$ of the first material constituting the layer and the conductivity $\sigma_{Sub}$ of the second material constituting the substrate; and secondly as a function of the ratio between the thickness of the coating layer Rev and the penetration depth of the magnetic field into the substrate Sub.

In summary, in this particular implementation of the invention, for a given probe frequency $F_n$, a value is measured for a physical characteristic that is an impedance $Z_n$, and the value of an indicator is deduced therefrom, specifically a conductivity $\sigma_n$ and/or a resistivity of a portion of the workpiece P through which the magnetic field $B_n$ passes.

In the method of the invention, the alternating electrical signal S fed to the induction means $M_{ind}$ is selected to adopt a plurality of predetermined given frequencies $F_1$ and $F_2$ over time. How these frequencies $F_1$ and $F_2$ are selected is explained below under the heading of pre-calibrating measurements.

When the signal S is under steady conditions (i.e. when the frequency of the electrical signal is equal to the predetermined frequency $F_1$ or $F_2$ to within ±5%), a measurement is made of the physical characteristic that varies as a function of the frequency $F_n$, of the conductivity $\sigma_{Rev}$ of the material of the coating layer, and consequently as a function of the magnetic field B induced in the workpiece P.

Two respective measurements $Z_1$ and $Z_2$ are thus obtained for the physical parameter $Z_n$, one being made when the frequency is equal to $F_1$ and the other when the frequency is equal to $F_2$.

From these respective impedance measurements $Z_1$ and $Z_2$, values $\sigma_1$ and $\sigma_2$ are calculated for an indicator $\sigma_n$ that is constituted by the conductivity of a portion of the workpiece through which the magnetic field $B_n$ passes.

For this purpose, a predetermined calculation formula is used having the general form $\sigma_n = f(Z_n, F_n, I_n, U_n)$ in which $Z_n$ is the measured impedance that is representative of the eddy current induced in the workpiece P by the induction means $M_{ind}$ fed with the probe signal S of frequency $F_n$, current $I_n$, and voltage $U_n$.

After calculating the respective values $\sigma_1$ and $\sigma_2$ taken by the indicator, the difference between $\sigma_1$ and $\sigma_2$ is taken using the formula:

Difference=$|\sigma_1 - \sigma_2|$.

Finally, by using data predetermined during calibration of the measurement means (see below under the heading calibration), the thickness of the coating layer situated in register with the induction means is calculated as a function of the measured difference between the indicator values $\sigma_n$ measured at the respective frequencies $F_1$ and $F_2$.

This predetermined data correlates possible differences between the indicator values $\sigma_n$ and corresponding values for the thickness $e_r$ of the coating layer. The data may be recorded in a database associating predetermined difference values with predetermined layer thicknesses. Alternatively, the prerecorded data may be in the form of a function having the form:

layer thickness value=$f$(difference between the indicator values).

Calibration: Determining Data Correlating Indicator Value Differences with Thickness Values In order to obtain this predetermined data, use is made of a series of calibration testpieces A, B, C, D, E, F, G, H, and I, each comprising a substrate made of said second material and a layer made of said first material, each of the calibration testpieces having a coating layer of known thickness.

Thereafter, for each calibration testpiece, at least one series of measurements is taken consisting in positioning the electromagnetic field induction means, or possibly other similar induction means, relative to the calibration testpiece layer and in evaluating first and second calibration values that are values taken by said indicator $\sigma_n$, and specifically in this example conductivity values $\sigma_n$. The first calibration value is determined for at least one measurement of a physical characteristic Z, specifically an impedance $Z_{et1}$ taken while the calibration induction means are fed with a first calibration signal $S_{eta}$ of frequency $F_1$ equal to said first frequency. In the same manner, the second calibration value is determined from at least one measurement of the physical characteristic, specifically an impedance $Z_{et2}$ taken while the calibration induction means are being fed with a second calibration signal $S_{eta}$ of frequency $F_2$ equal to said second frequency. Arrangements are preferably made to store the characteristics of the calibration signal in such a manner that the probe signal S generated at the moment of measuring the thickness of the layer on the workpiece P has the same characteristics as the calibration signal $S_{eta}$. Thus, for every workpiece P made of the same materials as the calibration testpiece and having substantially the same layer thickness, the following applies:

$S_{eta}$ at the frequency $F_1$ used for calibration is substantially equal to the probe signal S at the frequency $F_1$ used for measurement on a workpiece P; and $S_{eta}$ at the frequency $F_2$, used for calibration is substantially equal to the probe signal S at the frequency $F_2$ used for measurement on a workpiece P.

Still for the purpose of ensuring that calibration conditions are as close as possible to measurement conditions performed on a workpiece P, it is ensured that the measurement of the physical characteristic, i.e. the impedance, is taken during calibration using the same measurement means $M_{mes}$ as are used for taking measurements on a workpiece P. In a degraded mode, if the measurement means $M_{mes}$ used while taking a measurement on a workpiece are different from the measurement means used while taking a measurement on a calibration testpiece, then precautions should be taken to ensure that they have the same electrical characteristics (same resistance, same inductance).

After calculating the first and second values taken by the indicator $\sigma_n$ at the probe frequencies $F_1$ and $F_2$, the difference is calculated for each testpiece between the first and second values that are associated therewith.

By way of example, the differences in the values taken by the conductivity indicators $\sigma_1$ and $\sigma_2$ are given for the series of calibration testpieces A-I in the table below.

| Testpiece No. | Coating thickness ($\times 10^{-5}$ m) | $\sigma_1$ (MS/m) for $F_n = F_1 =$ 60 kHz | $\sigma_2$ (MS/m) for $F_n = F_2 =$ 480 kHz | Difference $\sigma_2 - \sigma_1$ (MS/m) for $F_1 = 60$ kHz and $F_2 = 480$ kHz |
|---|---|---|---|---|
| A | 0.017 | 0.6331 | 0.6332 | 0.0001 |
| B | 0.042 | 0.6330 | 0.6365 | 0.0035 |
| C | 0.047 | 0.6280 | 0.6343 | 0.0063 |
| D | 0.068 | 0.6315 | 0.6410 | 0.0095 |
| E | 0.083 | 0.6280 | 0.6427 | 0.0147 |
| F | 0.095 | 0.6340 | 0.6500 | 0.0160 |
| G | 0.112 | 0.6285 | 0.6533 | 0.0249 |
| H | 0.135 | 0.6400 | 0.6735 | 0.0335 |
| I | 0.148 | 0.6310 | 0.6676 | 0.0366 |

Figure 5:
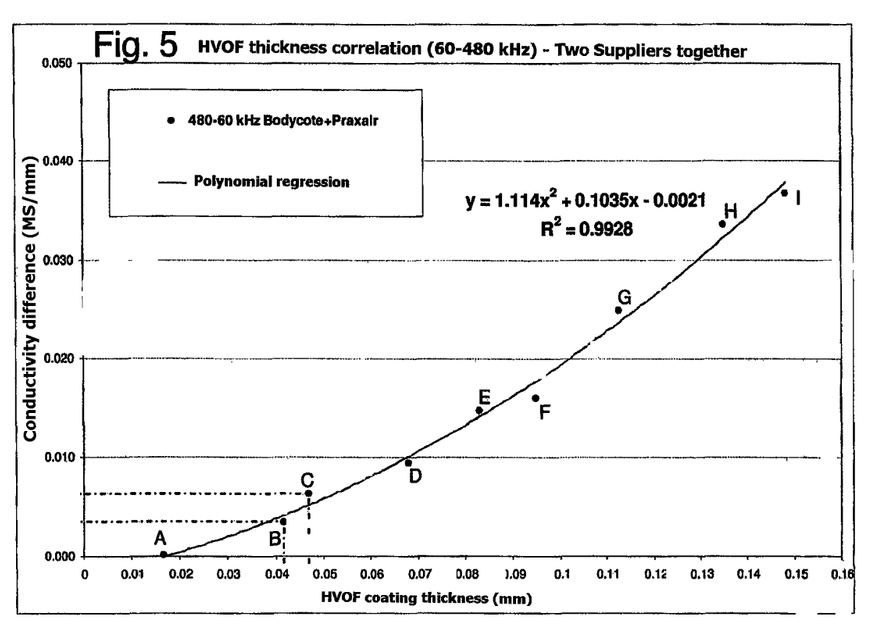
FIG. 5 is a graph showing conductivity difference measurements performed at frequencies $F_1$ and $F_2$ on a series of calibration testpieces having respective thicknesses plotted along the abscissa and a bijective polynomial regression curve obtained using the measurement and correlating the conductivity difference values with the coating thicknesses.

These readings are plotted on FIG. 5.

Given the increase in the series of thicknesses of the testpieces A-I and the corresponding variations in $\sigma_1$ and $\sigma_2$, it can be seen that the respective testpieces C and I ought to have values $\sigma_2$ greater than the values for $\sigma_2$ of the respective testpieces B and H, but that this is not so because of the conditions under which the coating layers were made on the testpieces B and H.

However, surprisingly, the fact of using the difference between first and second values $\sigma_1$ and $\sigma_2$ makes it possible, as can be seen from the curve in FIG. 5, which reproduces the data in the table, to obtain a statistical sequence that is consistent, that does indeed correlate the thickness with the difference, and with this applying even if the degrees of correlation between the respective series $\sigma_1$ and $\sigma_2$ and the difference are smaller.

Thus, the method of the invention using the difference between the indicator values $\sigma_1$ and $\sigma_2$ as correlated with the thickness $e_r$ makes it possible to measure thickness with improved accuracy. It should be observed that in a preferred implementation, the thickness values $\sigma_1$ and $\sigma_2$ of each testpiece are averages obtained from a plurality of successive measurements, thereby limiting any risk of error in the predetermined data correlating differences and thicknesses. It has been found that the method of the invention enables the thickness of the layer to be measured with tolerance of ±10 micrometers (μm) for carbide layers lying in the range 25 μm to 150 μm.

On the basis of the calibration data measured on the testpieces A-I, a polynomial regression is used to define a curve or a bijective function that, over a given thickness range, associates each thickness value with a difference between the values $\sigma_1$ and $\sigma_2$ of the conductivity indicator. This correlation relationship by means of a curve and/or by means of a mathematical function is stored in a memory and is subsequently used for taking measurements on workpieces P.

As explained below, the frequencies $F_1$ and $F_2$ are selected as a function of the first and second materials of the workpieces on which layer thickness measurements are to be made. Thus, for conductivity measurements taken on calibration testpieces having a correlation with the layer thicknesses is substantially equal to the correlation between the conductivity measurements taken on workpieces, it is desirable for the substrate thickness of the testpieces to be such that the field penetrates by less than half and preferably by less than one-third into the thickness of the testpiece substrate. The formula for calculating the penetration depths of the field at a given frequency of the probe signal is given below under the heading pre-calibration of the measurements.

Pre-Calibration of the Measurements

Under this heading it is explained how the first and second frequencies $F_1$ and $F_2$ are selected for use in taking measurements on workpieces P and on calibration testpieces in accordance with the method of the invention.

This pair of frequencies $F_1$ and $F_2$ for the alternating probe electrical signal must be suitable for inducing fields B in the workpieces P such as to make it possible to obtain a correlation between the indicator value difference and the thickness of the coating layer on the substrate that is to be measured.

For this purpose, a series of pre-calibration testpieces A-I is prepared in which the material of the substrates and the material of the coating layers are identical respectively with the material of the substrates and the material of the coating layers of the workpieces on which the coating thicknesses are to be measured. In the example below, the pre-calibration testpieces are the same as the calibration testpieces, however it would also be possible to use a series of pre-calibration testpieces that is different from the series of calibration testpieces.

After preparing the series of pre-calibration testpieces A-I, the thicknesses of their respective layers are measured and recorded (these thicknesses being given in the above table).

The frequencies $F_n$ of the probe electrical signal S fed to the induction means $M_{ind}$ are selected so that the magnetic field $B_n$ generated by the induction means in the workpiece does not pass right through the substrate Sub. This reduces disturbances to measurements that might otherwise occur as a result of the magnetic field $B_n$ being reflected against an outside face Fext of the substrate Sub.

Limiting the penetration depth of the electromagnetic field $B_n$ in this way serves to avoid any need to take account of the thickness $e_s$ of the substrate Sub when measuring impedance. It should be observed that the substrate thickness of a workpiece is generally well known since it is determined while fabricating the substrate, prior to applying the coating.

The standard penetration depth δ of an induced field is given by the formula:

$$\delta = 503/(\sqrt{\sigma \times \mu_r \times F_n})$$

where:
  δ is the depth in meters;
  σ is the electrical conductivity in siemens per meter (S/m) of the material Sub through which the induction field $B_n$ passes;
  $\mu_r$ is the magnetic permeability of this material (when the material is non-magnetic, as for titanium, aluminum, or alloys of these metals, $\mu_r = 1$, where $\mu_r$ is dimensionless); and
  $F_n$ is the frequency in hertz of the probe signal S for generating the induction field $B_n$ in the material Sub.

In order to determine the high frequency, $F_2$, it is desired for the magnetic field B as generated at the frequency $F_2$ to pass through at least one-third of the thickness of the layer that is to be measured. In this way, the measured physical characteristic Z is indeed a function of the thickness of the layer.

In summary, having approximate knowledge of the thickness $e_s$ of the substrate and of the conductivity $\sigma_n$ of the material constituting the substrate Sub, it is ensured that each of the fields induced by the signals at the selected frequencies $F_1$ and $F_2$ do indeed have respective penetration depths $\delta_1$ and $\delta_2$ that are less than one-third of the thickness $e_s$ of the substrate Sub. The lower frequency $F_1$ is selected to have a field penetration depth that is greater than the thickness of the layer to be measured. The higher frequency $F_2$ is selected so that the field penetrates into at least one-third of the thickness of the coating layer.

A coating Rev made of tungsten carbide WC deposited by high velocity spraying (using a technique of the type known as high velocity hydroxy oxygen fuel (HVOF) coating) has conductivity $\sigma_{WC} \approx 0.8$ megasiemens per meter (MS/m), a WC—Cr—Co coating has conductivity of 0.8 MS/m, and titanium has conductivity $\sigma_{Ti}$ lying in the range 0.6 MS/m$<\sigma_{Ti}<$0.8 MS/m. The conductivity of the Ti10.2.3 titanium alloy is $\sigma_{Ti10.2.3} \approx 0.74$ MS/m, and the conductivity of the Ti5.5.5.3 alloy is $\sigma_{Ti5.5.5.3}=0.61$ MS/m.

Using the above-mentioned formula and conductivity values, the penetration depths $\delta_n$ of the field $B_n$ in the materials are determined as a function of frequency $F_n$.

The following values are thus obtained:
with an induction signal at a frequency $F_n=10$ kHz: $\delta_n \approx 1690$ μm for the titanium substrate and $\delta_n \approx 110$ μm for the tungsten carbide coating;
with an induction signal at a frequency $F_n=60$ kHz: $\delta_n \approx 690$ μm for the titanium substrate and $\delta_n \approx 46$ μm for the tungsten carbide coating;
with an induction signal at a frequency $F_n=120$ kHz: $\delta_n \approx 480$ μm for the titanium substrate and $\delta_n \approx 30$ μm for the tungsten carbide coating;
with an induction signal at a frequency $F_n \approx 240$ kHz: $\delta_n \approx 344$ μm for the titanium substrate and $\delta_n \approx 23$ μm for the tungsten carbide coating;
with an induction signal at a frequency $F_n \approx 480$ kHz: $\delta_n \approx 240$ μm for the titanium substrate and $\delta_n \approx 16$ μm for the tungsten carbide coating; and
with an induction signal at a frequency $F_n \approx 960$ kHz: $\delta_n \approx 170$ μm for the titanium substrate and $\delta_n \approx 11$ μm for the tungsten carbide coating.

Thus, the low frequency $F_n \approx 10$ kHz cannot be used unless the thickness of the titanium substrate Sub is greater than $3 \times \delta_n = 5070$ μm.

The low frequency $F_n=60$ kHz can only be used for taking measurements if the thickness of the titanium substrate Sub is greater than $3 \times \delta_n = 2070$ μm.

The low frequency $F_n=120$ kHz can only be used for taking measurements if the thickness of the titanium substrate Sub is greater than $3 \times \delta_n = 1400$ μm.

In order to determine the values of the first and second frequencies $F_1$ and $F_2$, a series of pre-calibration measurements are performed on each of the pre-calibration testpieces for which the coating layer thicknesses are known, these measurements being taken at the various frequencies $F_n$ of the predefined series of pre-calibration frequencies. The predefined series of pre-calibration frequencies in the presently-described example lies in the range 60 kHz to 960 kHz.

Each pre-calibration measurement in the series of measurements is performed:
by positioning the electromagnetic field induction means relative to the layer of the pre-calibration testpiece and by feeding the pre-calibration alternating electrical signal $S_{et}$ to the induction means $M_{ind}$ so as to induce a magnetic field B in the pre-calibration testpiece that depends on the pre-calibration electrical signal; and
by measuring the physical characteristic (i.e. the impedance $Z_{eta}$ that varies as a function of the magnetic field induced in the pre-calibration testpiece); and then
by using the results of this measurement to deduce the value taken by the conductivity indicator (this conductivity depending on the conductivity of the layer first material and on the frequency $F_n$ of the pre-calibration signal at the time of the measurement).

After taking all of the measurements at the various frequencies for all of the pre-calibration testpieces, all of the values taken by the conductivity indicator are recorded and this data is analyzed in order to identify the pair of frequencies $F_1$ and $F_2$ that makes it possible to achieve the best correlation between the indicator value difference and the corresponding thickness values for the pre-calibration testpieces.

The analysis for determining the pair $F_1$ and $F_2$ consists:
for each pre-calibration testpiece for which the thickness of its layer is known, in calculating all of the possible differences between the indicator values determined with that pre-calibration testpiece; and then
in associating each difference as calculated in this way with the respective pair of frequencies used for determining these values of the indicator.

Thereafter, a series of correlation coefficients is calculated in order to evaluate the suitability of each of these potential pairs of frequencies for the purpose of measuring thickness.

In the above example, the potential pairs of frequencies are a first pair 60 kHz & 120 kHz, a second pair 60 kHz & 480 kHz, a third pair 60 kHz & 960 kHz, a fourth pair 120 kHz & 480 kHz, a fifth pair 120 kHz & 960 kHz, and a sixth pair 480 kHz & 960 kHz.

By using the data obtained for each of the pairs, it is possible for each pair to calculate a corresponding correlation coefficient $R^2$ representative of the correlation between:
the series of conductivity differences obtained at the frequencies of the pair; and
the series of pre-calibration testpiece thicknesses.

For example, by taking measurements at the above-mentioned frequencies on a series of titanium testpieces, each having a layer of tungsten carbide, the smallest correlation coefficient that is calculated is the coefficient that was obtained with the pair of frequencies 120 kHz & 960 kHz, for which $R^2=0.7162$, and the greatest correlation coefficient is the coefficient that was obtained with the pair of frequencies 60 kHz & 480 kHz, for which $R^2=0.9595$.

In order to measure thicknesses on workpieces P having the same substrate and layer materials, the pair of frequencies selected from the potential pairs of frequencies is the frequency pair 60 kHz & 480 kHz, since it presents the best correlation.

In other words, said first and second frequencies $F_1$ and $F_2$ are determined by selecting from the various pairs of frequencies at least one pair that enables at least a predetermined minimum level of correlation to be obtained between:
the indicator value differences determined for the testpieces in the series of pre-calibration testpieces; and
the thicknesses of the coating layers of the pre-calibration testpieces;
with the frequencies of the selected pair constituting said respective first and second frequencies.

It should be observed that the predetermined minimum level of correlation is selected to be not less than 0.90, since below that, it is considered that the correlation between the differences and the thicknesses is insufficient to be able to obtain a layer thickness measurement with satisfactory tolerance.

The invention is not limited to the above-described examples and it may include other implementations that are not described.

In particular, the invention may also relate to a method of fabricating a workpiece in which the coating is abraded and/or trued and in which the movement of the abrasion and/or truing tool is controlled as a function of measurements of the thickness of the coating layer performed using the measurement method of the invention. The thickness is preferably measured at the same time as the abrasion and/or truing operation. Controlling the tool by using the measured thickness of the coating layer makes it possible to move the tool so as to cause the thickness of the coating layer to tend towards a predetermined thickness. In this implementation, the nozzle B in FIG. 4 is replaced by an abrasion and/or truing tool, and the distance between the tool and the workpiece is managed so as to determine the depth of the machining and consequently the thickness of the layer.

The invention claimed is:

1. A method of measuring the thickness of a coating layer of a workpiece formed on a substrate of the workpiece, the coating and the substrate being constituted respectively by first and second mutually distinct electrically conductive materials, the method comprising:
   providing a generator that provides a probe alternating electrical signal;
   providing a positioning induction means having a coil and positioning the induction means relative to the coating layer and feeding the probe alternating electrical signal to the induction means in order to induce a magnetic field in the workpiece that depends on the probe alternating electrical signal;
   providing a position detector for detecting a position of the positioning induction means for detecting position of the induction means relative to the workpiece and producing a position information signal;
   providing measurement electronics and measuring at least one physical characteristic that varies as a function of the magnetic field induced in the workpiece;
   determining first and second values of an indicator, said indicator depending at least on the electrical conductivity of the first material and on a frequency of the probe alternating electrical signal, the first indicator value being determined from a measurement of said at least one physical characteristic taken when the probe alternating electrical signal has a first given frequency, and the second indicator value being determined from a measurement of said at least one physical characteristic taken when the probe alternating electrical signal has a second given frequency distinct from the first frequency; and
   providing a controller and operating said controller for (1) receiving the position information from the position detector, (2) calculating a difference between the first and second values of the indicator at positions on the workpiece, (3) determining the thickness of the coating layer as a function of said difference and of predetermined data, by correlating:
      the difference between the first and second values of the indicator; and
      corresponding values for thicknesses of the coating layer, and (4) preparing a correlation of determined thickness values and position information, and
   wherein, in order to determine the values of the first and second frequencies, the following steps are performed:
      A) on each testpiece of a set of pre-calibration testpieces having coating layer thicknesses that are different and known, taking a series of pre-calibration measurements performed at the various frequencies of a predefined series of pre-calibration frequencies, each pre-calibration measurement in this series of measurements consisting of:
         in positioning electromagnetic field induction means relative to the coating layer of the pre-calibration testpiece and in feeding a pre-calibration probe alternating electrical signal to said induction means in order to induce a magnetic field in the pre-calibration testpiece, which field depends on the pre-calibration electrical signal; and
         measuring a physical characteristic that varies as a function of the magnetic field induced in the pre-calibration testpiece and in using this measurement of the physical characteristic to deduce a value taken by an indicator that depends at least on the conductivity of the first material of the coating layer of the pre-calibration testpiece and on the frequency of the pre-calibration signal at the moment the measurement is taken; then
      B) for each pre-calibration testpiece for which the thickness of its layer is known, calculating all of the possible differences between the values of the indicator as determined with the pre-calibration testpiece and associating each difference as calculated in this way with the pair of frequencies that were used respectively for determining these values of the indicator; and
      C) determining said first and second frequencies by selecting from the various pairs of frequencies, at least one pair of frequencies that enables a predetermined minimum level of correlation to be obtained between:
         the value differences of the indicator as determined for the testpieces in the series of pre-calibration testpieces; and
         the thicknesses of the coating layers of the pre-calibration testpieces;
         with the frequencies of the selected pair constituting said first and second respective frequencies.

2. The method according to claim 1, wherein said indicator depending at least on the conductivity of the first material and on the frequency of the probe electrical signal, is a conductivity of a portion of the workpiece through which the magnetic field passes.

3. The method according to claim 2, wherein in order to obtain the predetermined data the following steps are performed:
   using a series of calibration testpieces, each comprising a substrate made of said second material and a layer made of said first material, each of the calibration testpieces having a known coating layer thickness;
   for each calibration testpiece, performing at least one series of measurements consisting in positioning magnetic field induction means relative to the layer of the calibration testpiece and evaluating first and second calibration values that are the values taken by said indicator, the first calibration value being determined from at least one measurement of said at least one physical characteristic taken while the induction means are being fed with a first calibration signal of frequency equal to said first frequency and the second calibration value being determined from at least one measurement of said at least one physical characteristic taken when the induction means are fed with a second calibration signal of frequency equal to said second frequency; and for each calibration testpiece, recording data correlating the known thickness of its coating layer with the first and second frequencies and the first and second calibration values.

4. The method according to claim 2, wherein said first and second calibration values are respective conductivity values calculated as a function of measurements of impedance taken on said calibration testpieces.

5. The method according to claim 1, wherein said first and second frequencies are selected so that the electromagnetic field generated by the induction means has a penetration depth into the second material that is less than three-fourths of the thickness of the substrate, preferably less than half this thickness of the substrate, and more preferably less than one-third this thickness of the substrate.

6. The method according to claim 5, wherein the value of the penetration depth of the electromagnetic field in the second material, referred to as the "standard" penetration depth $\delta_n$ in a material, is given by the following formula:

$$\delta_n = 503/(\sqrt{\sigma \times \mu_r \times F_n})$$

where:
  $\delta_n$ is the penetration depth in meters;
  $\sigma$ is the electrical conductivity of the material through which the induction field passes;
  $\mu_r$ is the magnetic permeability of the material through which the induction field passes; and
  $F_n$ is the frequency in hertz of the probe signal fed to the induction means for generating the electromagnetic field in the material.

7. A method of measuring the thickness of a coating layer of a workpiece formed on a substrate of the workpiece, the coating and the substrate being constituted respectively by first and second mutually distinct electrically conductive materials, the method comprising:
  providing a generator that provides a probe alternating electrical signal;
  providing a positioning induction means having a coil and positioning the induction means relative to the coating layer and feeding the probe alternating electrical signal to the induction means in order to induce a magnetic field in the workpiece that depends on the probe alternating electrical signal;
  providing measurement electronics and measuring at least one physical characteristic that varies as a function of the magnetic field induced in the workpiece;
  determining first and second values of an indicator, this indicator depending at least on the electrical conductivity of the first material and on the frequency of the probe alternating electrical signal, the first indicator value -being determined from a measurement of said at least one physical characteristic taken when the probe alternating electrical signal has a first given frequency, and the second indicator value being determined from a measurement of said at least one physical characteristic taken when the probe alternating electrical signal has a second given frequency distinct from the first frequency; and then
  providing a controller and calculating the difference between the first and second values of the indicator and determining the thickness of the coating layer as a function of this difference and of predetermined data correlating:
  the difference between the indicator values; and
  corresponding values for thicknesses of the coating layer,
  wherein, in order to determine the values of the first and second frequencies, the following steps are performed:
    A) on each testpiece of a set of pre-calibration testpieces having coating layer thicknesses that are different and known, taking a series of pre-calibration measurements performed at the various frequencies of a predefined series of pre-calibration frequencies, each pre-calibration measurement in this series of measurements consisting of:
      in positioning electromagnetic field induction means relative to the coating layer of the pre-calibration testpiece and in feeding a pre-calibration probe alternating electrical signal to said induction means in order to induce a magnetic field in the pre-calibration testpiece, which field depends on the pre-calibration probe alternating electrical signal; and
      measuring a physical characteristic that varies as a function of the magnetic field induced in the pre-calibration testpiece and in using this measurement of the physical characteristic to deduce a value taken by an indicator that depends at least on the conductivity of the first material of the coating layer of the pre-calibration testpiece and on the frequency of the pre-calibration signal at the moment the measurement is taken; then
    B) for each pre-calibration testpiece for which the thickness of its layer is known, calculating all of the possible differences between the values of the indicator as determined with the pre-calibration testpiece and associating each difference as calculated in this way with the pair of frequencies that were used respectively for determining these values of the indicator; and
    C) determining said first and second frequencies by selecting from the various pairs of frequencies, at least one pair of frequencies that enables a predetermined minimum level of correlation to be obtained between:
    the value differences of the indicator as determined for the testpieces in the series of pre-calibration testpieces; and
    the thicknesses of the coating layers of the pre-calibration testpieces;
    with the frequencies of the selected pair constituting said first and second respective frequencies.

8. The method according to claim 7, wherein the physical characteristic that varies as a function of the magnetic field induced in the pre-calibration testpiece is an impedance, and the indicator depending at least on the conductivity of the first material of the coating layer of the pre-calibration testpiece is the conductivity of a portion of the pre-calibration testpiece.

* * * * *